Patented July 19, 1932

1,868,124

UNITED STATES PATENT OFFICE

PAUL E. THOMASCHEWSKI, OF WILMINGTON, DELAWARE, ASSIGNOR TO E. I. DU PONT DE NEMOURS & COMPANY, OF WILMINGTON, DELAWARE, A CORPORATION OF DELAWARE

PROCESS FOR THE MANUFACTURE OF MONOBENZOYLDIAMINOANTHRAQUINONES

No Drawing.   Application filed June 16, 1928.   Serial No. 286,066.

This invention relates to a process for the preparation of monobenzoyldiaminoanthraquinones.

Monobenzoyldiaminoanthraquinones are important intermediates in the manufacture of dyestuffs. They can be prepared either by benzoylating nitroaminoanthraquinones and reducing the nitrobenzoylaminoanthraquinones or by partial benzoylation of diaminoanthraquinones.

Processes of the latter art are described in United States Patent #1,660,090 and in British Patent #276,692 (not yet accepted). The former uses benzoic anhydride, the latter benzoyl chloride in connection with agents capable of absorbing acid such as pyridine, quinoline, sodium carbonate, or magnesia.

We have now found that the use of common salt in place of the acid absorbing agents in the benzoyl chloride process has a remarkable effect. It insures a rapid filtration, and if benzoyl chloride be used in proportions of about one molecule to one molecule of diaminoanthraquinone, the monobenzoyl derivative is the main product.

Excellent results are also obtained if instead of sodium chloride the chlorides of the alkali and alkaline earth metals are used, as, for instance, potassium chloride, ammonium chloride, calcium chloride or barium chloride.

To illustrate the process more fully, the following examples may be given:

Example 1

238 parts of 1:5-diaminoanthraquinone and 120 parts of dried and ground sodium chloride are heated with 2380 parts of nitrobenzene to 200° C. under agitation and 140 parts of benzoyl chloride added during one hour. The solution is then allowed to cool to 120° C. and filtered on a heated suction filter and washed with 100 parts of warm nitrobenzene. The dibenzoyl compound remains on the filter and can be freed from salt by washing with water and dried (wt. about 70 parts). From the filtrate the monobenzoyl derivative crystallizes, when completely cool. It is filtered off and washed with alcohol. It weighs from 210 to 240 parts. For many purposes its purity will be sufficient. To obtain it in a chemically pure state it is dissolved in 10 times its weight of concentrated sulphuric acid at a temperature of 10° C., 2½ parts of ice water are added slowly, preventing, by cooling, the temperature to rise above 15° C. The sulphate of the monobenzoyldiaminoanthraquinone crystallizes in colorless needles. It is filtered and washed with sulphuric acid of the same concentration. The cake is drowned in water, when hydrolysis takes place and the orange-red monobenzoyl compound filtered and washed acid free. In concentrated sulphuric acid it gives a slightly colored solution, which assumes an intense violet coloration by the addition of formaldehyde.

Example 2

20 parts of 1:4-diaminoanthraquinone and 15 parts of ammonium chloride are heated with 400 parts of orthodichlorobenzene to 165° C. and 13.5 parts of benzoyl chloride are run in slowly under agitation. During the reaction and after cooling to 30° C. the monobenzoyl-1:4-diaminoanthraquinone separates in needles. It is filtered off, washed with alcohol then with water, and dried. It is practically free from the dibenzoyl derivative.

In order to secure the monobenzoyl compound in purified form, the product of the reaction may be dissolved in ten parts of concentrated sulphuric acid and 2½ parts of water added, whereupon the sulphate appears in yellow crystals, which are filtered off and hydrolyzed by the addition of water to the violet monobenzoyl-1:4-diaminoanthraquinone.

The proportion given in the examples may, of course, be varied. If more than one molecule of benzoyl chloride is used, more dibenzoyl compound is formed. Using about 15% less than theory practically no dibenzoyl compound is formed. The temperatures may be raised to the boiling point of the nitrobenzene or lowered to 150° C. without impairing the result. Other solvents, than those illustrated, may be used. If desired, the mixture, before filtering off the dibenzoyl compound, may be diluted with alcohol.

I claim:

1. The process of preparing a monobenzoyldiaminoanthraquinone which comprises heating a diaminoanthraquinone with benzoyl chloride in the presence of sodium chloride.

2. The process of preparing a monobenzoyldiaminoanthraquinone which comprises heating a diaminoanthraquinone with benzoyl chloride in the presence of a chloride of a metal of the group consisting of alkali metals and alkaline earth metals.

3. The process of preparing a monobenzoyldiaminoanthraquinone which comprises heating a diaminoanthraquinone with benzoyl chloride in the presence of a solvent therefor and a chloride of the class consisting of sodium chloride, potassium chloride, ammonium chloride, calcium chloride and barium chloride.

4. In the process of preparing monobenzoyldiaminoanthraquinones which comprises heating a diaminoanthraquinone in the presence of a solvent thereof with benzoyl chloride, the step which comprises reacting benzoyl chloride and the diaminoanthraquinone in substantially molecular proportions in the presence of a chloride of a metal of the group consisting of alkali metals and alkaline earth metals.

5. In the process which comprises treating an alpha diaminoanthraquinone in the presence of a solvent therefor with benzoyl chloride, the step which comprises reacting benzoyl chloride and the diaminoanthraquinone in substantially molecular proportions in the presence of a chloride of a metal of the group consisting of alkali metals and alkaline earth metals.

6. The process of preparing a monobenzoyldiaminoanthraquinone which comprises heating 1:5-diaminoanthraquinone with benzoyl chloride in the presence of nitrobenzene and sodium chloride.

7. The process which comprises heating an alpha diaminoanthraquinone with benzoyl chloride in the presence of an inert solvent of high boiling point and a chloride of the class consisting of sodium chloride, potassium chloride, ammonium chloride, calcium chloride and barium chloride.

8. In the process which comprises heating an alpha diaminoanthraquinone in the presence of an inert solvent of high boiling point with benzoyl chloride, the step which comprises reacting the benzoyl chloride and alpha diaminoanthraquinone in substantially molecular proportions in the presence of a chloride of a metal of the group consisting of alkali metals and alkaline earth metals.

9. The process of preparing a monobenzoyldiaminoanthraquinone which comprises heating 1:5-diaminoanthraquinone with benzoyl chloride above 150° C. in the presence of nitrobenzene and sodium chloride.

In testimony whereof, I affix my signature.

PAUL E. THOMASCHEWSKI.